United States Patent [19]
Kent

[11] 4,214,397
[45] Jul. 29, 1980

[54] FISHING WORM LURE

[76] Inventor: Leslie W. Kent, 5111 Stagecoach, Tyler, Tex. 75701

[21] Appl. No.: 927,511

[22] Filed: Jul. 24, 1978

Related U.S. Application Data

[63] Continuation of Ser. No. 761,948, Jan. 24, 1977, abandoned.

[51] Int. Cl.² ............................................. A01K 85/00
[52] U.S. Cl. ................................. 43/42.28; 43/42.35; 43/42.53
[58] Field of Search ................... 43/42.1, 42.22, 42.24, 43/42.25, 42.26, 42.28, 42.3, 42.31, 42.32, 42.33, 42.34, 42.35, 42.37, 42.53, 42.06

[56] References Cited

U.S. PATENT DOCUMENTS

| | | | |
|---|---|---|---|
| 2,641,080 | 6/1953 | Wise | 43/42.33 X |
| 2,781,604 | 2/1957 | Brown | 43/42.28 |
| 3,631,626 | 1/1972 | Keenan | 43/42.34 |
| 3,971,152 | 7/1976 | Husson | 43/42.06 |
| 3,986,291 | 10/1976 | Hopper | 43/42.28 |
| 4,051,619 | 10/1977 | McClellan | 43/42.24 |
| 4,069,610 | 1/1978 | Firmin | 43/42.31 |

*Primary Examiner*—Nicholas P. Godici
*Attorney, Agent, or Firm*—Richards, Harris & Medlock

[57] ABSTRACT

The specification discloses an elastomeric fishing worm lure. The lure includes a solid head portion having a cylindrical cross-sectional shape along with a hollow tubular central portion having a cylindrical cross-sectional shape. A plurality of circular grooved ribs extend throughout the internal length of the hollow tubular central portion for retaining air within the tubular central portion and for decreasing the discharge rate of the air retained therein when the lure is submerged in water. A hollow tail portion extends from the hollow tubular central portion and includes a plurality of tail segments. Each of the plurality of tail segments includes a plurality of grooved ribs for increasing water turbulence as the lure is moved through water.

8 Claims, 8 Drawing Figures

FISHING WORM LURE

This is a continuation of application Ser. No. 761,948 filed Jan. 24, 1977 now abandoned.

FIELD OF THE INVENTION

This invention relates to fishing lures, and more particularly to an elastomeric fishing worm lure having a solid head portion and a flexible hollow tubular central portion.

THE PRIOR ART

Fishermen generally agree that fish are attracted to both visual and audible stimuli. It is therefore desirable that an effective fishing lure impart both visual and audible sensations to fish as the lure is moved through water. Visual stimulus is normally created by the shape, color and movement of a lure, while audible stimulus is normally generated by turbulence caused by movement of the lure through the water.

It has long been known to use solid plastic worms for fishing lures. Such prior fishing worm lures have created visual stimuli, but have created very little audible stimuli due to their solid construction. At least one prior elongated plastic lure has been completely hollow, but such lure has not functioned to generate substantial turbulence or resulting sound in the desired frequency range. Moreover, such prior hollow worm lures have not provided an area for secure attachment of a worm rig for attaching the lure to a fishing line.

A need has thus arisen for a fishing worm lure which provides both visual and substantial audible stimuli in a suitable combination to attract fish. Such a lure should have a construction strong enough to withstand repeated use and to enable secure attachment to a worm rig, while being sufficiently flexible to provide a configuration for generating substantial turbulence and noise in the desired frequency range when in use.

SUMMARY OF THE INVENTION

The present invention is directed to a fishing worm lure for generating turbulence and audible stimuli to fish as the lure moves through water, which substantially eliminates or reduces the disadvantages associated with prior art worm lures.

In accordance with the present invention, an elastomeric fishing worm lure comprises a solid head portion having a cylindrical cross-sectional shape. A flexible hollow tubular central portion having a cylindrical cross-sectional shape is also provided. The flexible hollow tubular central portion includes a plurality of circular grooved ribs extending throughout the internal length of the tubular central portion for retaining air within the tubular central portion and for decreasing the discharge rate of the air retained therein when the lure is submerged in water. A flexible hollow tail portion extends from the flexible hollow tubular central portion and includes a plurality of tail segments. The tail segments further include a plurality of grooved ribs for increasing water turbulence as the lure is moved through water.

In accordance with another aspect of the invention, an elastomeric fishing worm lure includes a solid head portion having a first elasticity. A flexible hollow tubular central portion and a hollow tail portion are provided having a second elasticity.

In accordance with another aspect of the present invention, a method of manufacturing an elastomeric fishing worm lure includes molding an elastomeric material to form a solid head portion of the lure. A grooved mandrel is attached to the solid head portion of the lure. The mandrel and solid head portion are submerged in a molten elastomeric material such that the molten elastomeric material forms a coating around the head portion and grooved mandrel. After the coating has cooled the mandrel is removed thereby forming a tubular hollow portion of the lure. A plurality of slits are cut in the end of the hollow tubular portion to form a tail for the lure.

DESCRIPTION OF THE DRAWINGS

For a more complete understanding of the present invention and for further objects and advantages thereof, reference is now made to the following description taken in conjunction with the accompanying drawings, in which.

DESCRIPTION OF THE PREFERRED EMBODIMENT

Figure 1:
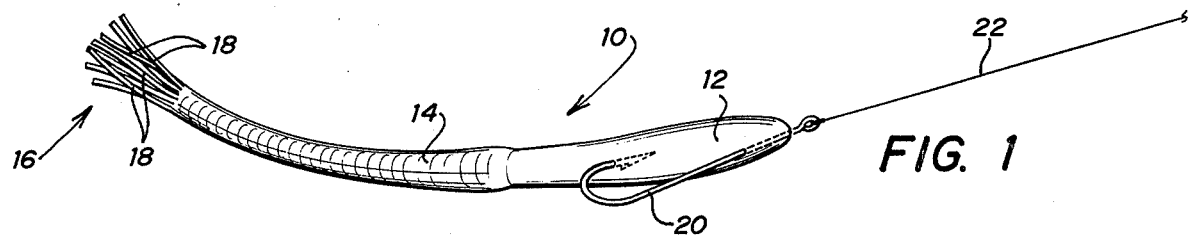
FIG. 1 is a perspective view of the present fishing worm lure.

Referring to FIG. 1, the fishing worm lure of the present invention is illustrated and is identified generally by the numeral 10. The lure 10 includes a solid head portion 12, which is solid in structure. A flexible hollow tubular central portion 14 lies contiguous to the solid head portion 12. Extending from the hollow tubular central portion 14 is a flexible hollow tail portion identified generally by the numeral 16. The flexible tail portion 16 includes a plurality of tail segments 18. A conventional worm rig 20 is insertable through the head portion 12 of the lure 10 for attachment to a fishing line 22. Although one method of attachment of the worm rig 20 to the lure 10 is illustrated in FIG. 1, other methods known to those skilled in the art can also be utilized.

In the preferred embodiment, the worm lure 10 is molded from an elastomeric material selected from the thermoplastic polymer family, such as, for example, polyvinyl chloride (PVC). Lure 10 is formed of PVC of sufficient strength that damage does not occur to the tubular hollow central portion 14 or tail portion 16 during use. Furthermore, the head portion 12 has sufficient strength to enable a worm rig to be secured therethrough.

The elastomeric nature of the lure 10 permits the lure 10 to freely move through water and respond to current fluctuations, thereby creating visual stimuli to the sensory organs of a fish. The movement of the lure 10 through water also causes the tail segments 18 to gyrate to provide additional visual stimulus to a fish. The movement of the tail segments 18 further causes a water turbulence to be developed. This turbulence, in conjunction with trapped air escaping from the hollow tubular central portion 14 of the lure 10, generates acoustical waves resonating in a frequency range which attracts fish to the lure 10.

An important aspect of the present invention is that air and water have lower viscosity and density than the PVC plastic forming the lure 10. The trapping of the air and water within the hollow portion 14 of the lure 10 thus allows the present lure to be more flexible than a conventional solid worm lure and to have a fluidlike motion of substantial action as it is towed through the water. The central portion 14 continuously yields and flexes under the forces created by the water, and causes in many instances the release of air bubbles which further attract fish. This flexibility and ease of movement under water, along with the turbulence and air bubbles gererated thereby, creates a unique combination of visual and audible stimuli to attract fish to the lure 10.

Figure 2:
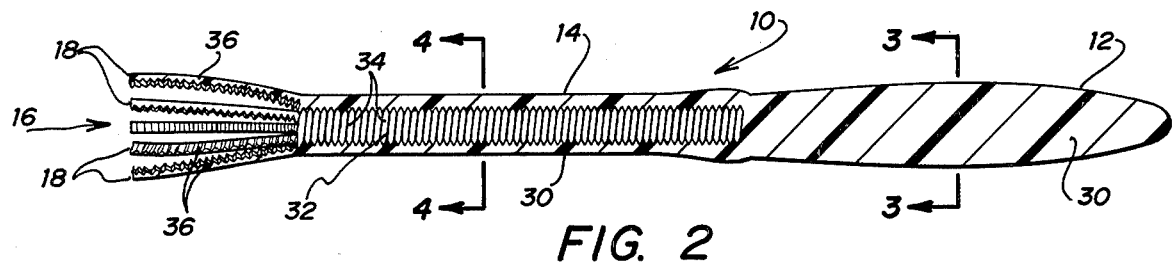
FIG. 2 is a sectional view taken along the length of the fishing worm lure shown in FIG. 1 illustrating a first embodiment of the present invention.
Figure 3:
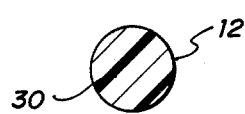
FIG. 3 is a sectional view taken generally along sectional lines 3—3 of FIG. 2.
Figure 4:
FIG. 4 is sectional view taken generally along sectional lines 4—4 of FIG. 2.

Referring simultaneously to FIGS. 2, 3 and 4, wherein like numerals are utilized for like and corresponding parts previously identified, the illustrated embodiment of the fishing lure 10 includes a body 30 having the same elasticity throughout the entire lure 10. The hollow tubular central portion 14 includes a chamber 32, extending from the solid head portion 12 to the tail portion 16 of the lure 10. Extending throughout the internal length of the chamber 32 are a plurality of circular grooved ribs 34. The circular grooved ribs 34 function to retain and trap air within the central portion 14 when the lure 10 is submerged. Because air is initially retained within the lure 10, as water fills the hollow tubular portion 14 and replaces the trapped air therein, air bubbles are formed and are released from the tail portion 16 of the lure 10. As previously stated, these air bubbles excite both the auditory and visual sensors of a fish. As the lure 10 is pulled under water, the substitution of water for the trapped air within the central portion 14 also creates a disturbance of the currents within the water to attract fish.

In the manufacturing process of molding the lure 10, the body 30 is formed in conventional mating mold halves. The rear portion of the mold, which forms the tail portion 16 of the lure 10, includes structure for centrally supporting a grooved mandrel within the mold. Polyvinyl chloride resin is then injected into the mold halves to completely fill the mold, thereby forming the solid head portion 12 of the lure 10. The polyvinyl chloride resin surrounds the mandrel extending into the mold to thereby form the hollow tubular central portion 14 and the grooved ribs 34 of the lure 10.

The plurality of tail segments 18 are formed by slitting the end of the central portion 14 of the lure 10. Each of the tail segments 18 includes a plurality of grooved ribs 36. Grooved ribs 36 of the tail segments 18 function to generate a turbulence within the water as the lure 10 is manipulated by the fisherman.

Figure 5:
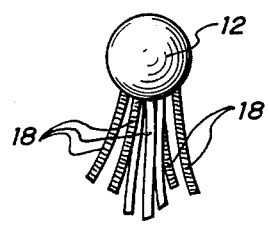
FIG. 5 is a front end view of the fishing worm lure of FIG. 1.
Figure 6:
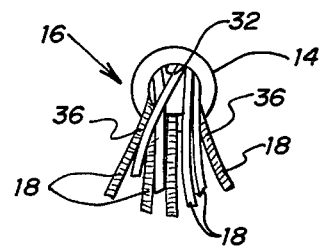
FIG. 6 is a rear end view of the fishing worm lure shown in FIG. 1.

FIGS. 5 and 6 illustrate the relative position of the tail segments 18 with respect to the head portion 12 and central portion 14 of the lure 10. In still waters and when the lure 10 is not being pulled through the water, the tail segments 18 hang downwardly from the body 30 of the lure 10. When the lure is being towed through the water, the tail segments 18 undulate and randomly move in order to create an attractive and exciting lure. The shape of the lure 10 therefore provides visual stimuli in both the vertical and horizontal directions to attract fish to the lure 10.

Figure 7:
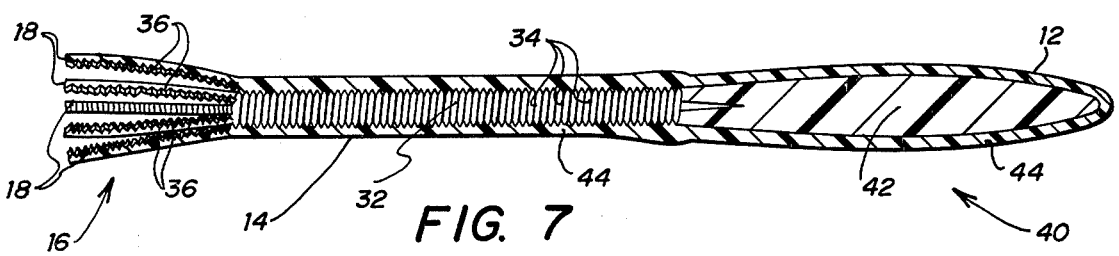
FIG. 7 is a sectional view taken along the length of the fishing worm lure shown in FIG. 1 illustrating a second embodiment of the present invention.

FIG. 7 illustrates a second embodiment of the present invention, identified generally by the numeral 40. Like numerals are utilized in FIG. 7 for like and corresponding parts previously identified. The worm lure 40 includes the head portion 12, hollow tubular central portion 14 and the tail portion 16. However, unlike the lure 10, the body 42 of the head portion 12 is composed of an elastomeric material having a different elasticity than the body 44 comprising the central portion 14 and tail portion 16 of the lure 40.

The elasticity of the elastomeric material is controlled by the addition of a plasticizer to the plastic resin. A plasticizer is a compound incorporated in a plastic to facilitate processing, to increase its workability and its flexibility or distensibility. Conventionally, plasticizers for polyvinyl chloride resins may comprise esters of aliphatic and aromatic di-and tricarboxylic acids and organic phosphates. In the preferred embodiment, the plasticizer utilized in conjunction with the polyvinyl chloride resin to mold the lures 10 and 40 is bis (2-ethylhexyl) phthalate or dioctyl phthalate (DOP). In the preferred embodiment, 20% more plasticizer is utilized to mold the body 42 of the head portion 12 than is utilized to mold the body 44 of the central portion 14 and tail portion 16 of the lure 40. This ratio of plasticizer causes the head portion 12 of the lure 40 to be softer and more flexible than the central portion 14 and tail portion 16 to allow for easy insertion of a worm rig through the head portion 12, while maintaining necessary strength for the tubular and tail portions.

Figure 8:
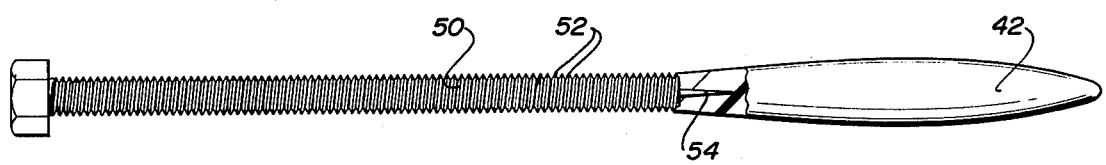
FIG. 8 is a side elevation view of a lure head body portion and a mandrel, illustrating certain aspects of the method of manufacturing a second embodiment of the present invention.

FIG. 8 illustrates certain aspects of the manufacturing process for molding the lure 40. The body 42 of the head portion 12 of lure 40 is separately molded from the body 44. The body 42 may be molded in conventional mold halves or in a conventional centrifugal mold using polyvinyl chloride resin including a plasticizer in order to provide a lure head which is relatively flexible. The body 42 is then attached to a mandrel 50. The mandrel 50 includes threads 52, which form the grooved ribs 34 extending throughout the internal length of the chamber 32 (FIG. 7). The body 42 is attached to the mandrel 50 using a spike or tack 54 which is welded to the end of the mandrel 50. The mandrel 50, including the attached body 42 of the head portion 12, is then submerged in a molten elastomeric material having a different elasticity than the material utilized to form the body 42.

The mandrel 50 is then removed from the molten elastomeric material and the excess molten elastomeric material is drained off. The molten elastomeric material forms a coating around the mandrel 50 and around the body 42 of the head portion 12. When the coating is sufficiently cooled, the mandrel 50 can be disconnected from the head portion 12 and removed from the coating to form the flexible hollow tubular central portion 14 (FIG. 7) of the lure 40. The tail portion 16 of the lure 40 is then formed by cutting a plurality of slits in the end of the hollow tubular central portion 14 to form the plurality of tail segments 18 (FIG. 7).

Although the head portion of the fishing lure of the present invention has been described as having the configuration of a worm, other head configurations may be utilized. For example, the head configuration of a squid or shrimp may be substituted for the worm head, while utilizing a hollow body portion for the lure. In addition, the color and dimensions of the fishing lure of the present invention may be modified depending upon the type of fish being sought.

Whereas the present invention has been described with respect to specific embodiments thereof, it will be understood that various changes and modifications will be suggested to one skilled in the art, and it is intended to encompass such changes and modifications as fall within the scope of the appended claims.

What is claimed is:

1. A flexible fishing lure for creating visual and auditory stimuli while being towed through water comprising:
    a solid flexible elongate head portion having a predetermined cross sectional shape and having front and rear ends, said solid flexible elongate head portion formed from flexible elastomeric material for providing lifelike flexibility and for being penetrated by the pointed end of a fishing hook while being of sufficient dimension and strength for positively and securely receiving and supporting the fishing hook inserted therein to provide a water tight connection between said solid flexible elongate head portion and the fishing hook, such that said fishing hook pointed end penetrates and is securely supported by said solid flexible elongate head portion;
    a flexible buoyant elongate tubular central portion having an integral and continuous exterior surface to prevent water from entering the fishing lure through said exterior surface of said flexible elongate tubular central portion, said flexible buoyant elongate tubular central portion further having front and rear ends, said front end of said flexible elongate tubular central portion being integrally connected to said rear end of said solid flexible elongate head portion in order to prevent water from entering said flexible elongate tubular central portion through said front end of said flexible elongate tubular central portion and to permit the fishing lure to twist and flex during the towing thereof through the water;
    structure forming a centrally disposed hollow continuous unobstructed closed cavity extending through said flexible elongate tubular central portion and having a uniform cylindrical cross sectional shape and being disposed substantially parallel to said exterior surface of said flexible elongate tubular central portion, one end of said hollow continuous unobstructed closed cavity being closed by said solid flexible elongate head portion and the opposite end thereof being open, such that said centrally disposed hollow continuous unobstructed closed cavity fills with air prior to being submerged in water, said cavity being configured and structured to retain air to therefore be made buoyant, said hollow continuous unobstructed closed cavity thereafter receiving water only through said open end during towing of the fishing lure under water in order to release air bubbles from within the fishing lure, said solid flexible elongate head portion being nonbuoyant such that said flexible buoyant elongate tubular central portion is maintained at a higher level than said solid flexible elongate head portion when the fishing lure is generally stationary under water; and
    a flexible hollow tail portion integrally extending from said rear end of said flexible elongate tubular central portion and operable to move during towing of the fishing lure under water to create visual and auditory stimuli to attract fish to the fishing lure.

2. The fishing lure of claim 1 wherein said solid flexible elongate head portion is formed from an elastomeric material having a first elasticity and said flexible elongate tubular central portion and said flexible hollow tail portion are formed from an elastomeric material having a second elasticity.

3. The fishing lure of claim 2 wherein said first elasticity is greater than said second elasticity.

4. The fishing lure of claim 1 and further comprising:
    a plurality of tail segments formed by slits therein to thereby form said flexible hollow tail portion.

5. A fishing lure for creating visual and auditory stimuli while being towed through water comprising:
    a solid flexible elongate head portion having a cylindrical cross sectional shape and having front and rear ends, said solid flexible elongate head portion formed from elastomeric material to provide lifelike flexibility while being of sufficient dimension and strength for securely receiving the pointed end of a fishing hook inserted therein, such that said fishing hook pointed end penetrates and is supported by said solid flexible elongate head portion;
    a flexible elongate tubular central portion having an integral exterior surface, front and rear ends and a cylindrical cross sectional shape generally approximate to the cylindrical cross sectional shape of said solid flexible elongate head portion, said front end of said flexible elongate tubular central portion being integrally connected to said rear end of said solid flexible elongate head portion in order to permit the fishing lure to twist and flex during the towing thereof through the water;
    structure forming a centrally disposed hollow continuous unobstructed closed cavity extending through said flexible elongate tubular central portion and having a uniform cylindrical cross sectional shape and being disposed substantially parallel to said exterior surface of said flexible elongate tubular central portion, one end of said hollow continuous unobstructed closed cavity being closed by said solid flexible elongate head portion and the opposite end thereof being open, such that said centrally disposed hollow continuous unobstructed closed cavity fills with air prior to being submerged in water;
    said hollow continuous unobstructed closed cavity including a plurality of helical grooved ribs formed in and completely around the interior walls of said centrally disposed hollow continuous closed cavity to therefore be made buoyant, said cavity thereafter receiving water only through said open end during towing of the fishing lure under water, such that said grooved ribs retain air within said cavity and decrease the discharge rate of the air obtained therein to release air bubbles therefrom when the fishing lure is submerged and towed under water, said solid flexible elongate head portion being nonbuoyant such that said flexible buoyant elongate tubular central portion is maintained at a higher level than said solid flexible elongate head portion when the fishing lure is generally stationary under water; and a flexible hollow tail portion integrally extending from said rear end of said flexible elongate tubular central portion and operable to move during towing of the lure under water to create visual and auditory stimuli to attract fish to the lure.

6. The fishing lure of claim 5 wherein said solid flexible elongate head portion is formed from an elastomeric material having a first elasticity and said flexible elongate tubular central portion and said flexible hollow tail portion are formed from an elastomeric material having a second elasticity.

7. The fishing lure of claim 6 wherein said first elasticity is greater than said second elasticity.

8. The fishing lure of claim 5 and further comprising:
a plurality of tail segments formed by slits therein forming said flexible hollow tail portion, said plurality of tail segments including a plurality of helical grooved ribs thereon being continuous with said continuous helical grooved ribs formed in the interior closed walls of said centrally disposed hollow continuous closed cavity.

* * * * *